Aug. 22, 1933.  A. J. FORTESCUE  1,923,196
TRACTION WHEEL
Filed Aug. 12, 1930   2 Sheets-Sheet 1

Inventor
Albert John Fortescue
By B. Singer, atty

Aug. 22, 1933.   A. J. FORTESCUE   1,923,196
TRACTION WHEEL
Filed Aug. 12, 1930   2 Sheets-Sheet 2
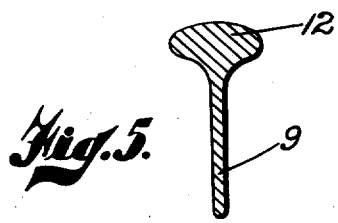
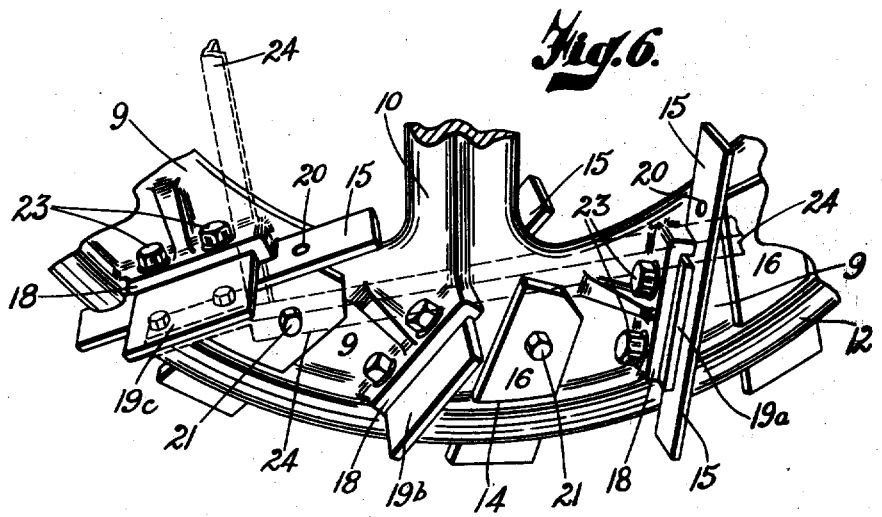

Patented Aug. 22, 1933

1,923,196

UNITED STATES PATENT OFFICE 1,923,196

TRACTION WHEEL

Albert John Fortescue, Arncliffe, New South Wales, Australia

Application August 12, 1930, Serial No. 474,727, and in Australia April 29, 1930

3 Claims. (Cl. 301—41)

This invention relates to improvements in wheels for tractors, power driven vehicles, and the like, and is especially applicable for military purposes.

The invention more particularly relates to improvements to a wheel in which the main portion may be of pressed or cast steel built up by spokes in the nature of a wheel having a narrow tire or rim preferably formed with a crown face which may consist of rubber, steel or the like and approximately one quarter to one half the width of an ordinary tractor or other wheel tire or rim.

The main portion of the wheel to which the invention relates has a number of tread plates of various lengths disposed in series and whereby when the wheel is in operation a new section of ground is presented to each of the succeeding tread plates in the series. The tire is formed with slots or recesses on each edge alternately spaced to receive suitable spud members.

The present invention has reference to a wheel of the above kind which will be efficient in use and wherein provision is made to support and protect the ends of the longest tread plates.

A further object of the invention is to provide means such as supporting members for preventing side slipping of a wheel of the above kind when operating on hillsides and also for minimizing the jolting effects upon the tractor when the wheel passes over hard surfaces. To support and protect the ends of the longest tread plates I employ a supporting and protecting rim or frame of a size considerably less than the diameter of the tire of the wheel.

The supporting and protecting rim or frame, is preferably secured to the outer ends of the longest tread plates, the later being suitably secured to the said drum of frame by bolts, brackets or other suitable means. This construction enables the longest tread plates to be supported at or near their outer ends and protects them from damage when striking against obstacles such as stumps or stones or when struck by passing vehicles.

The protecting rim or frame also reduces side slip when operating in soft ground and tends to prevent overturning of the implement or vehicle to which the wheel is fitted, for instance when crossing a shell hole or the like.

But in order that the invention may be more readily understood reference will now be made to the accompanying drawings wherein:—

Figure 5 is a sectional view through the rim of the wheel on the line 5—5 of Figure 2.

Figure 6 is a perspective view of a wheel of the kind referred to showing the extendible supporting members or spuds, and the rim or frame for protecting the tread plates.

Figure 1:
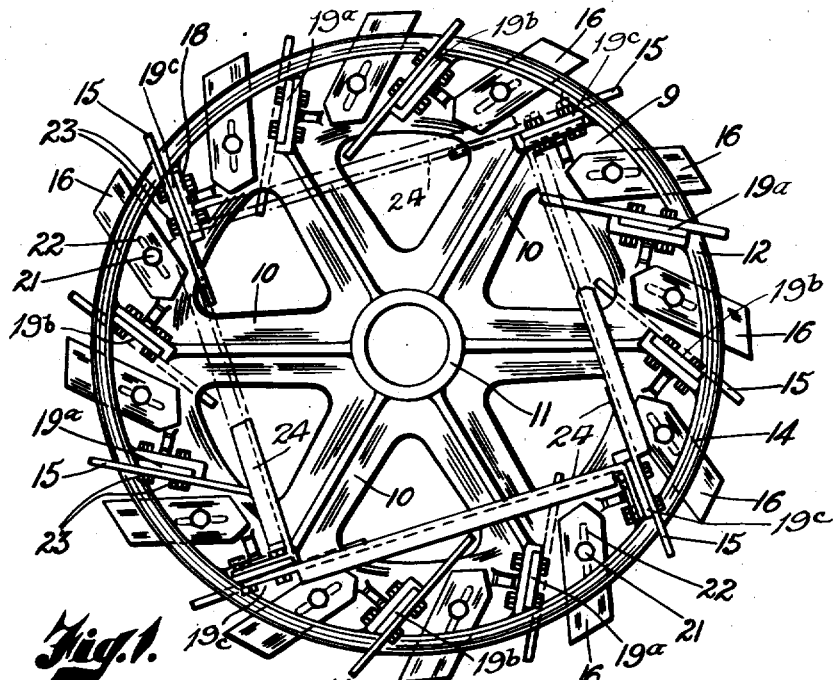
Figure 1 is an elevational view of my improved wheel.
Figure 2:
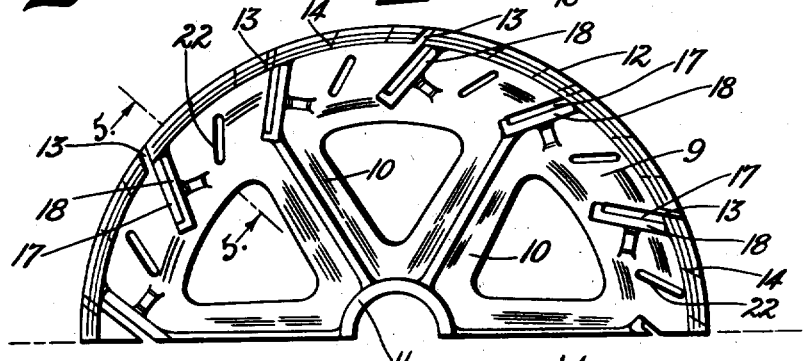
Figure 2 is an elevational view of a portion of the wheel with the spuds and tread plates omitted.

The main portion 9 of the wheel to which the present invention relates may have spokes 10 as illustrated, radiating from a hub 11. A comparatively narrow rim 12 is formed upon the main portion 9 and has recesses 13 and slots 14 formed therein to receive the spuds 15 and the supporting memebrs or spuds 16.

The main portion 9 is also preferably formed with inclined slots 17 and has lateral projections 18 disposed on each side thereof.

Tread plates 19 of different lengths are placed in series on the main portion 9 of the wheel. In the wheel illustrated series of tread plates 19 of three different lengths are used. They are indicated by the numerals 19a, 19b and 19c, the former being the smallest and the latter being the longest. The intermediate tread plate 19b is of proportionate length to the plates 19a and 19c.

Figures 3, 4:
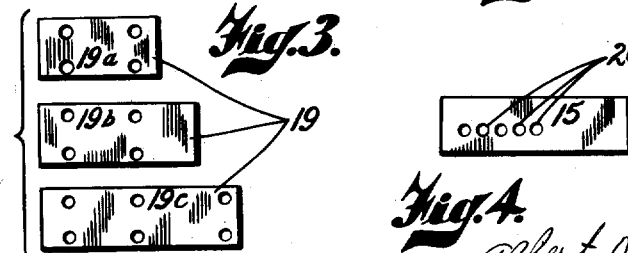
Figure 3 illustrates a group of tread plates for the wheel.
Figure 4 illustrates one form of gripping spud.

The spuds 15, Figure 4, are provided with a plurality of bolts which pass through holes 20 whereby they are adjustably and extendibly secured to the respective alternate lateral projections 18.

The supporting members or spuds 16 which form part of the present invention are disposed in spaced relation in the slots 14 in the rim 12 and are provided to prevent side slipping of the wheel when operating on hillsides and in country having holes such as shell holes or the like. The supporting members 16 are also provided to minimize the jolting effects upon the wheel when the alternately disposed extendible spuds 15, henceforth referred to as spuds 15, are extended particularly when operating upon hard ground and upon road or like surfaces.

It will be observed that the supporting members 16, disposed in the slots 14, extend through the rim 12 of the wheel and are capable of being extended therethrough into line with the outer edges of the spuds 15. The supporting members thereby form a tread between the said respective spuds 15 and are capable of being used to support part of the load when the wheel is operating on a hard surface.

The supporting members 16 are illustrated adjustably attached to the wheel 9 for instance by bolts 21 which are adapted to move in slots 22 in the main portion 9 of the wheel.

In assembling the tread plates 19 and the spuds 15, as illustrated, the former are disposed in order, according to their length. One of the spuds 15 is then placed over each tread plate 19 on alternate sides of the main portion 9 of the wheel and bolts 23 are then passed through the said spuds 15, tread plates 19, and the lateral projections 18 to secure the two former in position.

A rim or frame 24 is provided to protect the projecting tread plates 19 when the wheel is working in country where stumps or stones are likely to be encountered by the tread plates. The rim or frame 24 also acts to support the overhanging ends of the longest tread plates 19c to which it is bolted.

In operation, the wheel will be found to be very effective, due to the fact that the series of tread plates 19, owing to their different lengths, engage a fresh portion of ground which is undisturbed by the previous tread plate 19, and is consequently in a condition to offer resistance to the pull exerted by the wheel. Furthermore as the wheel sinks into mud or soft ground a greater proportion of tread plate and spud surface is brought into operation. The sinking of the wheel in mud or soft ground results in a gain in the power available at the axle for effecting tractive purposes.

I claim:

1. A tractor wheel comprising a main portion provided with a single narrow tire having radial slots and also having recesses located alternately on opposite sides thereof, lateral projections disposed on each side of the main portion within the inner circumference of the narrow tire, said projections supporting tread plates and extensible gripping spuds, said spuds being disposed in said recesses of the tire, and radially and circumferentially extending supporting spuds extensible through said slots in the tire, said tread plates being inclined and of different lengths and disposed in series, the tread plates also extending laterally with respect to the main portion.

2. In a tractor wheel comprising a main portion provided with a single narrow tire having lateral projections within the inner circumference thereof receiving inclined tread plates of different lengths disposed in series, each tread plate adapted to engage when the wheel rolls, an area of ground undisturbed by the next preceding tread plate, said tire being provided with recesses formed alternately on opposite sides thereof and receiving inclined extensible gripping spuds secured to the respective tread plates, and a plurality of radially and circumferentially extending supporting spuds radially adjustably secured to the main portion of the wheel for relieving the gripping spuds of a portion of the load upon the wheel and also preventing damage to the tractor by obviating bumping of the wheel over hard surfaces.

3. A tractor wheel comprising a main portion provided with a single narrow tire having lateral projections within the inner circumference thereof receiving inclined tread plates of different lengths disposed in series each tread plate adapted to engage when the wheel rolls, an area of ground undisturbed by the next preceding tread plate, said tire being provided with recesses formed alternately on opposite sides thereof and receiving inclined extensible gripping spuds secured to the respective tread plates, a plurality of extensible supporting spuds disposed in the main portion of the wheel between the gripping spuds and parallel to the median plane of the wheel, said supporting spuds being adapted to relieve the gripping spuds of a portion of the load upon the wheel when moving over hard ground and also preventing damage to the tractor by obviating bumping of the wheel over hard surfaces, and a frame secured to and supporting the outer ends of the longest tread plates.

ALBERT JOHN FORTESCUE.